United States Patent
Gaudreau et al.

(10) Patent No.: US 12,483,330 B2
(45) Date of Patent: Nov. 25, 2025

(54) FULL CONTROL OF POLARISATION IN FIBRE DELIVERED LIGHT FOR HARSH ENVIRONMENTS

(71) Applicant: National Research Council of Canada, Ottawa (CA)

(72) Inventors: Louis Gaudreau, Ottawa (CA); Jason Phoenix, Keene (CA); Sergei Studenikin, Orleans (CA); Marek Korkusinski, Ottawa (CA); Alex Bogan, Ottawa (CA); Andrew Sachrajda, Ottawa (CA); Robin Williams, Ottawa (CA); Piotr Zawadzki, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 0 days.

(21) Appl. No.: 17/923,387

(22) PCT Filed: May 5, 2021

(86) PCT No.: PCT/CA2021/050631
§ 371 (c)(1),
(2) Date: Nov. 4, 2022

(87) PCT Pub. No.: WO2021/223027
PCT Pub. Date: Nov. 11, 2021

(65) Prior Publication Data
US 2023/0077503 A1    Mar. 16, 2023

Related U.S. Application Data

(60) Provisional application No. 63/111,207, filed on Nov. 9, 2020, provisional application No. 63/020,637, filed on May 6, 2020.

(51) Int. Cl.
*H04B 10/2569* (2013.01)
*H04B 10/2525* (2013.01)

(52) U.S. Cl.
CPC ..... *H04B 10/2569* (2013.01); *H04B 10/2525* (2013.01)

(58) Field of Classification Search
CPC .................................................. H04B 10/2569
See application file for complete search history.

(56) References Cited

U.S. PATENT DOCUMENTS

| 4,960,318 A | 10/1990 | Nilsson et al. |
| 4,960,319 A | 10/1990 | Dankowych |

(Continued)

FOREIGN PATENT DOCUMENTS

NO    2001091342 A2    11/2001

OTHER PUBLICATIONS

Mack et al., "Local control of light polarization with low temperature fiber optics", Optics Letters, vol. 32, No. 11, Jun. 2007 (Year: 2007).*

(Continued)

*Primary Examiner* — Shi K Li
(74) *Attorney, Agent, or Firm* — Aird & McBurney LP

(57) ABSTRACT

A method of transmitting information comprising the steps of: (a) transmitting at least one photon via a fibre; (b) characterizing the fibre by determining at least one depolarization loss caused by the fibre; and (c) compensating for polarization altering effects of the fibre; wherein a single photon source is used for delivery of individual polarized photons in harsh environments.

15 Claims, 6 Drawing Sheets

(56) References Cited

U.S. PATENT DOCUMENTS

| | | | |
|---|---|---|---|
| 9,581,622 B2 | 2/2017 | Mueller et al. | |
| 9,851,622 B2 | 12/2017 | Song | |
| 2002/0060760 A1* | 5/2002 | Weiner ............... | H04B 10/2569 349/96 |
| 2017/0328809 A1 | 11/2017 | Chen et al. | |

OTHER PUBLICATIONS

NIST, "Closed Cycle Refrigerators", Updated Mar. 2020 (Year: 2020).*

Chen, J., et al. "Active polarization stabilization in optical fibers suitable for quantum key distribution." Optics Express 15.26 (2007): 17928-17936.

Xavier, G. B., et al. "Full polarization control for fiber optical quantum communication systems using polarization encoding." Optics Express 16.3 (2008): 1867-1873.

Xavier, G. B., et al. "Experimental polarization encoded quantum key distribution over optical fibres with real-time continuous birefringence compensation." New Journal of Physics 11.4 (2009): 045015.

Pinto, A. N., et al. "Optical quantum communications: An experimental approach." International Conference on Applications of Optics and Photonics. vol. 8001. SPIE, 2011.

Dynes, J. F., et al. "Stability of high bit rate quantum key distribution on installed fiber." Optics Express 20.15 (2012): 16339-16347.

OZ Optics (2016) "Electrically Driven Polarization Controller-Scrambler". Retrieved on Nov. 17, 2022 at https://www.ozoptics.com/ALLNEW_PDF/DTS0011.pdf.

Ding, Y.-Y., et al. "Polarization variations in installed fibers and their influence on quantum key distribution systems." Optics Express 25.22 (2017): 27923-27936.

Kalra, R., et al. "Vibration-induced electrical noise in a cryogen-free dilution refrigerator: Characterization, mitigation, and impact on qubit coherence." Review of Scientific Instruments 87.7 (2016): 073905.

Gisin, N., et al. "Polarization mode dispersion of short and long single-mode fibers." Journal of Lightwave Technology 9.7 (1991): 821-827.

Manhas, S. et al. "Demonstration of full 4×4 Mueller polarimetry through an optical fiber for endoscopic applications." Optics Express 23.3 (2015): 3047-3054.

International Search Report issued in International Application No. PCT/CA2021/050631, Jul. 7, 2021, 4 pages.

Written Opinion of the International Searching Authority issued in International Application No. PCT/CA2021/050631, Jul. 7, 2021, 4 pages.

Phoenix, J., et al. "Full polarization control of fiber-delivered light in a dilution refrigerator." Review of Scientific Instruments 91.8 (2020): 083107.

Woliński, T. R., et al. "Polarization mode dispersion in birefringent microstructured fibers." Acta Physica Polonica A 103.2-3 (2003): 211-219.

Mirza, A. R. "Optimizing quantum communication through hybrid technology." Thesis, University of Kwazulu-Natal (2012).

Xiong, W., et al. "Complete polarization control in multimode fibers with polarization and mode coupling." Light: Science & Applications 7.1 (2018): 1-10.

Högele, A., et al. "Fiber-based confocal microscope for cryogenic spectroscopy." Review of Scientific Instruments 79.2 (2008): 023709.

* cited by examiner

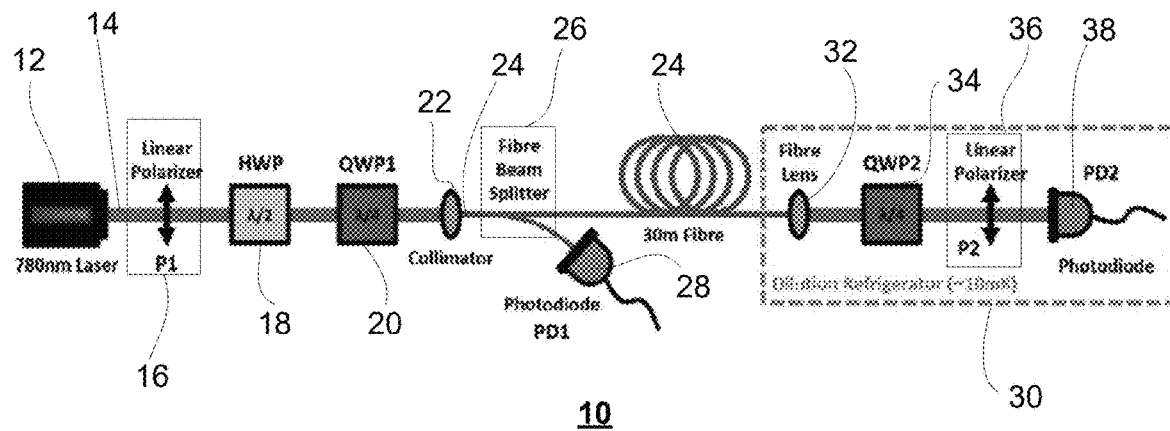
Figure 1
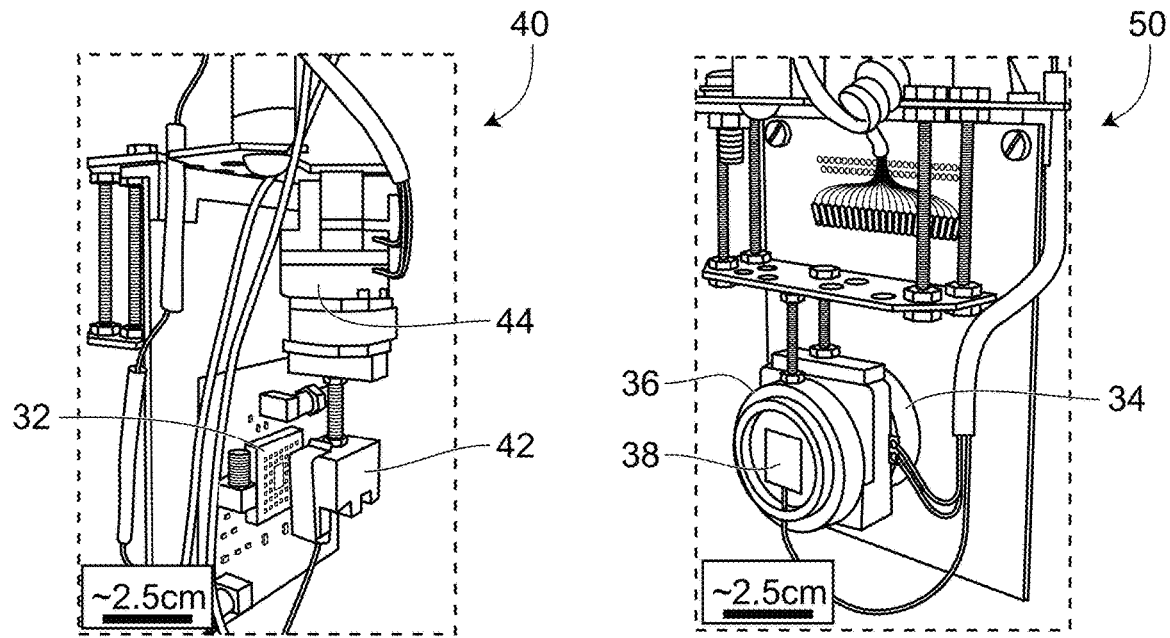
Figure 2a                    Figure 2b

FULL CONTROL OF POLARISATION IN FIBRE DELIVERED LIGHT FOR HARSH ENVIRONMENTS

FIELD

Aspects of this disclosure relate to methods and systems for compensating for the effect of the fibre on the polarisation of light.

BACKGROUND

The ability of optical fibres to transmit light over long distances with minimal signal loss (0.2 dB/km) has made them a common telecommunications technology and a prime candidate for use as a means of photon delivery in quantum communication applications. A well-known drawback of standard optical fibres is that the birefringence of their cores prevents them from preserving the polarisation of the light they transmit. Compensation is therefore required to accurately deliver the desired photon polarisation states through a fibre [1-4].

Adjustment of the polarisation can be performed using polarisation controllers [1-5], which twist, bend, squeeze or stretch the fibre, thereby artificially altering its birefringence [6]. Electronic versions of these devices employ feedback and optimization systems to manipulate the fibre and produce the appropriate polarisation at the fibre output. Compensation for a fibre's effects on polarisation is often achieved by transmitting an ancillary signal with a known polarisation. The second signal provides a measure of the change in fibre birefringence and acts as a reference when attempting to correct the output polarisation. Some of the schemes which are used to perform these corrections include temporal multiplexing [1, 3, 7], wavelength multiplexing [2-4] and two-fibre systems, where the reference pulses are transmitted along a second channel neighbouring the primary channel [3, 5]. While the overall efficiency and success of these schemes depends upon such factors as the fibre length and environment, they are generally ill-suited for the extreme conditions of cryogenic applications.

It is therefore an object of the present disclosure to mitigate or obviate at least one of the above-mentioned disadvantages.

SUMMARY

In one aspect, there is provided a method of transmitting information comprising the steps of:
(a) transmitting at least one photon via a fibre;
(b) determining at least one depolarization loss caused by the fibre; and
(c) compensating for polarization altering effects of the fibre.

In another aspect, there is provided a method of transmitting information via a transmission path comprising the steps of:
(a) generating a model of the transmission path comprising the steps of:
(i) inputting at least one photon of a known polarization state from a light source into a one end of a fibre;
(ii) detecting the at least one photon outputted at another end of the fibre;
(iii) determining the intensity of the outputted at least one photon;
(iv) measuring the output polarization state of the at least one photon to generate at least one polarization map;
(b) determining characteristics of the transmission path by fitting the output polarization state of the at least one photon to the model;
(c) determining an orientation angle of at least one optical component for introduction into the transmission path for compensating for polarization altering effects of the fibre.

In another aspect, there is provided a method of compensating for transmission impairment, the method comprising:
receiving at least one photon of a known polarization state which has been distorted by an optical transmission channel;
processing the outputted at least one photon by modeling an optical fibre, corresponding to the optical fibre, in an optical transmission channel, corresponding to the optical transmission channel, the modeling using a plurality of input parameters.

In another aspect, there is provided a phase-preserving system for delivering any polarisation state, including elliptical and circular states, to a dilution refrigerator via a standard, 30 m, single mode optical fibre. A compact optical setup installed in the refrigerator allows for accurate identification of the polarisation of light reaching the sample while maintaining cryogenic temperatures. A mathematical model of the system is generated by sending known polarisations into the fibre and observing the corresponding output states. Waveplates (half-wave and quarter-wave) are used to compensate for the polarisation-altering effects of the fibre so that high-fidelity, arbitrary polarisation states may be delivered from room temperature to the bottom of the refrigerator while operating at millikelvin temperatures. The cryogen-free dilution refrigerator used in these experiments maintains a stable temperature gradient along the fibre, which resolves the issue of temperature fluctuations experienced by dilution refrigerators due to changing helium bath levels.

Advantageously, there is provided a fibre-based delivery of photon polarisation states to a dilution refrigerator at low temperatures, wherein a plurality of standard states are delivered to the refrigerator with fidelities greater than 0.96. Accordingly, the system allows for the transmission of several randomly-selected elliptical states, in addition to the standard six states, and furthermore, the system preserves the phase and allows for delivery of any polarisation state to the refrigerator. The system comprises a compact polarisation readout scheme suitable for installation in cryostats, and the system is substantially stable over a period of at least four days. In addition, since photons propagating in parallel tend not to interact with each other, the system presented also functions similarly when single photons are used instead of a laser beam. The single photon experiences the same effects as each photon in the beam and should therefore have the same state at the fibre output.

BRIEF DESCRIPTION OF THE DRAWINGS

FIG. 1 shows an experimental setup of a system for delivering polarized light through a standard optical fibre and verify delivery of the desired states;
FIG. 2a shows a sample holder and positioning system;
FIG. 2b shows a cryogenic optical table.

DETAILED DESCRIPTION

Figure 3:
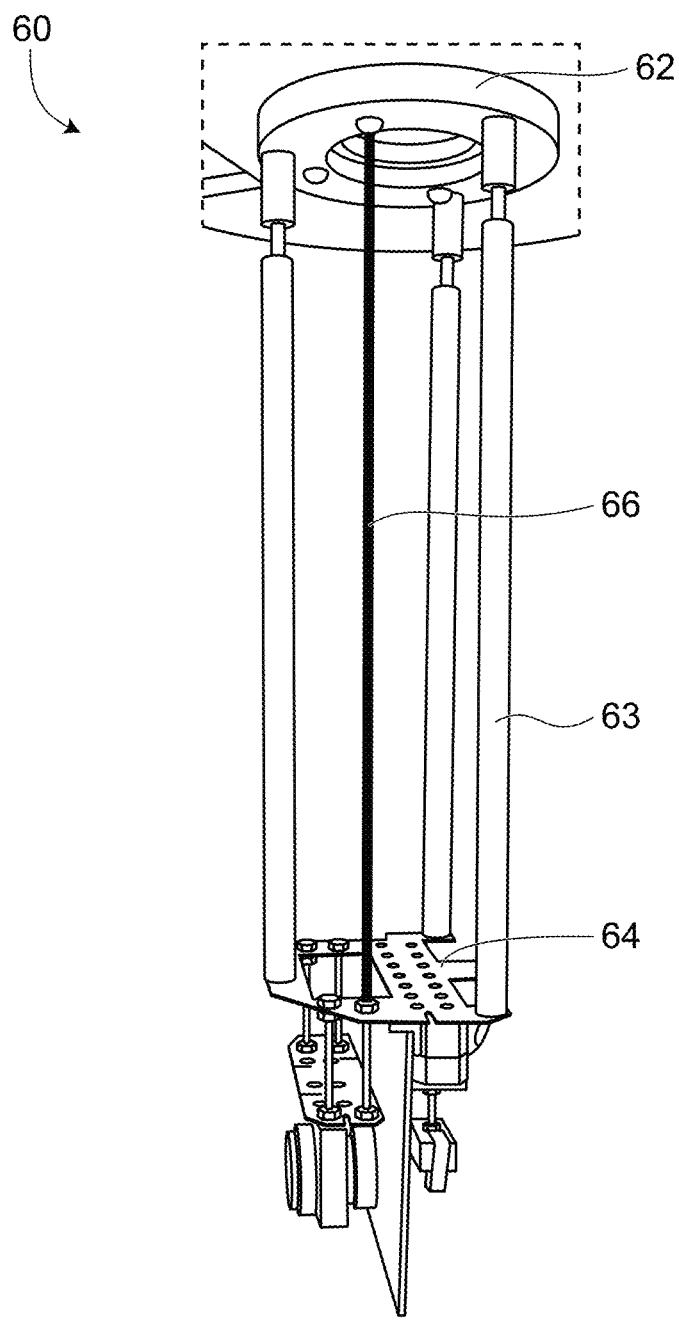
FIG. 3 shows a thermal anchoring setup.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Referring to FIG. 1, there is shown an experimental setup of a system 10 for delivering polarized light through a standard optical fibre and verify delivery of the desired states. System 10 comprises laser source 12, such as fibre coupled laser source e.g. model no. S1FC980 manufactured by Thorlabs, Inc., U.S.A., using a Tsunami® Series Ti: Sapphire laser from Spectra-Physics Inc., California, U.S.A. In one example, laser beam 14 was tuned to 780 nm and first directed through linear polariser 16, such as nanoparticle linear film polarizer e.g. model no. LPNIR050 manufactured by Thorlabs, Inc., U.S.A., to produce pure linear polarisation, and linear polariser 16 is mounted in a manual rotator (not shown). Past linear polariser 16, beam 14 travel through half-wave plate 18, such as mounted achromatic half-wave plate e.g. model no. AHWP05M-980 manufactured by Thorlabs, Inc., U.S.A., and quarter-wave plate 20, such as mounted achromatic quarter-wave plate e.g. part no. AQWP05M-980, manufactured by Thorlabs, Inc., U.S.A. Half-wave plate 18 and quarter-wave plate 20 are mounted on computer-controlled mechanical rotators. Triplet collimator 22, such as e.g. part no. TC06APC-780, manufactured by Thorlabs, Inc., U.S.A. with wavelength range of 742 to 823 nm, couples the free space beam 14 into fibre 24. The combination of half-wave plate 18 and quarter-wave plate 20 allows for the generation of a plurality of polarisation states at the input of the fibre 22. A 50:50 fibre beam splitter 26 e.g. part no. FUSED-12-850-5/125-50/50-3A3A3A-3-1 from Oz Optics Limited, Ottawa, Canada and photodiode 28 e.g. part no. S130C manufactured by Thorlabs, Inc., U.S.A., are used to monitor the intensity of light entering fibre 24 so that fluctuations may be filtered out of the data during post-processing. Light 14 is then transmitted to dilution refrigerator 30, such as part no. BF-LD250 manufactured by Bluefors Oy, Helsinki, Finland, by 30-metre-long 780HP single mode fibre 24.

As shown in FIGS. 2*a-b* and FIG. 3, with the sample holder and positioning system 40 installed in dilution refrigerator 30 with a base temperature of under 10 mK. Polarized light 14 is transmitted from the top of the dilution refrigerator 30 at room temperature to the mixing chamber (MC) flange by a single mode, 750 nm fibre 24. A lensed fibre 32, such as Adamant, SLF R4 SMF FC/APC, delivers the light to a custom-built cryogenic optical setup, which is thermocoupled to the mixing chamber flange. In one example, the total length of the refrigerator fibres is 2 m. The system 40's electrical components, including RF and DC lines mounted on a printed circuit board, are used for electrical control of samples 42. Three piezoelectric positioners 44 e.g. ANPx101/RES, and ANPz101/RES from Attocube Systems, U.S.A., provide sub-micron positioning of the lensed fibre 32 in the x, y and z directions, as depicted in FIG. 2*a*. The positioners 42 are used both to focus light on the samples and to direct the beam through a hole in the circuit board.

Looking at FIG. 2*b* showing cryogenic optical table 50, mounted behind the circuit board is a polarisation identification system consisting of zero-order quarter-wave plate 34 e.g. Thorlabs, WPQ05M-808, linear polariser 36 e.g. Thorlabs, LPNIR100, and photodiode 38 e.g. Thorlabs, FDS1010. Quarter-wave plate (QWP2) 34 is mounted in a piezoelectric rotator e.g. Attocube, ANR240/RES. Polariser 36 is aligned with polariser 16 to simplify the model of the system. As photodiode 38 responds to incident light even without a reverse bias applied, the bias is set to 0 V throughout experiments conducted, which results in less Joule heating. It maintains a linear relationship between the power of the incident light and the resulting photocurrent for power levels ranging from 0 to ~30 µW. This system permits monitoring the intensity of the light passing through polariser 36 as a function of QWP2 34 angle, which produces a unique pattern for each polarisation state. FIG. 3 shows a thermal anchoring setup 60 comprising copper ring 62, stainless steel tunes 63, brass base plate 64 and copper cable 66.

To deterministically deliver particular polarisation states via fibre 24 (i.e. to know in advance precisely how to compensate for the fibre 24's effects on polarisation), a complete characterisation of the fibre 24's birefringent core is initiated, and comprises a mathematical model of a general retarding material. The standard representation of a polarisation retarder, such as a waveplate, takes the following form when written using Jones matrices:

$$M = R(-\theta)D(\phi)R(\theta) = \begin{pmatrix} \cos\theta & -\sin\theta \\ \sin\theta & \cos\theta \end{pmatrix} \begin{pmatrix} e^{-i\phi/2} & 0 \\ 0 & e^{i\phi/2} \end{pmatrix} \begin{pmatrix} \cos\theta & \sin\theta \\ -\sin\theta & \cos\theta \end{pmatrix}$$

where D ($\phi$) is a waveplate matrix with a phase delay (in radians) of $\phi$ and a fast axis oriented horizontally. R($\theta$)

is a rotation matrix which translates between the reference frames of the lab and waveplate. M therefore represents a retarder with a fast axis which has been rotated by an angle 0; from the horizontal. A mathematical description of an optical fibre's m effect on polarisation may be achieved by considering the fibre to be composed of a series of n retarding plates. Each plate $M_i$ has a unique retardance $\phi_i$; and a fast axis rotated by an angle $\theta_i$; from the horizontal. The fibre A may then be described by:

$$A = M_{n-1}M_{n-2} \ldots M_2M_1M_0$$
$$= R(-\theta_{n-1})D(\phi_{n-1})R(\theta_{n-1})R(-\theta_{n-2})D(\phi_{n-2})R(\theta_{n-2}) \ldots$$
$$= \prod_{i=1}^{n} R(-\theta_{n-i})D(\phi_{n-i})R(\theta_{n-i})$$

When this equation is written using Mueller matrices, it can be shown that the application of the pull-through lemma to this equation reduces it to the following simplified result:

$$A = R(-\theta_a)D(\phi)R(\phi_b)$$

The polarisation of light at the fibre output is calculated by solving for the three fibre parameters $\theta_a$, $\theta_b$, and $\phi$, which may be achieved by sending known states into the fibre and comparing them with the output states. The angles $\theta_a$ and $\theta_b$, are different in this equation since a plurality of retarding plates are concatenated, whereas there is only one angle $\theta$ in Equation 1. This fibre model ignores certain aspects of a fibre, such as potential depolarisation and photon losses, although these particular properties may be determined by careful characterisation of the output states themselves.

Figure 4:
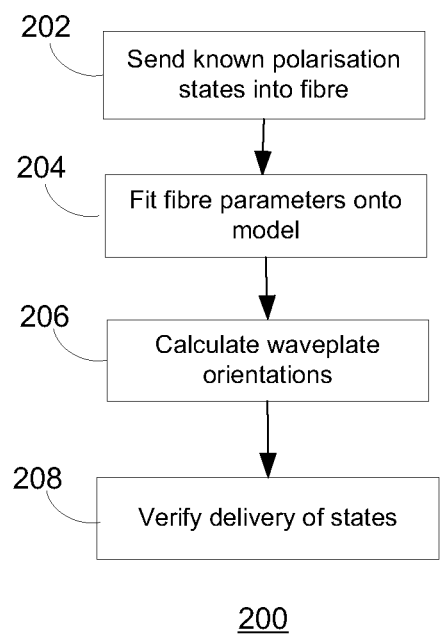
FIG. 4 shows a flowchart with exemplary steps for delivering polarized light via a fibre while compensating for transmission impairments due the fibre.
Figure 5A:
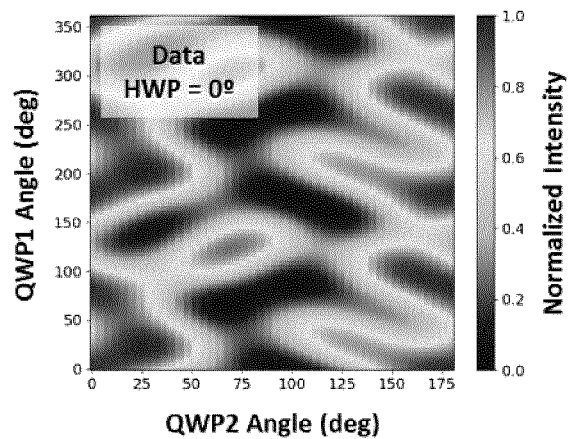
FIG. 5a-b shows the resulting polarisation maps for two different angles of a half-wave plate.
Figure 5B:
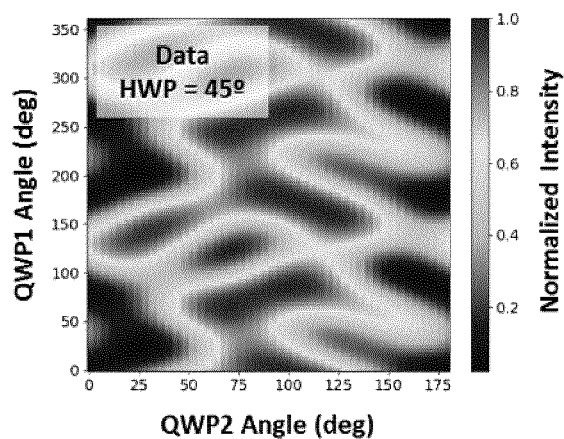
Figure 5C:
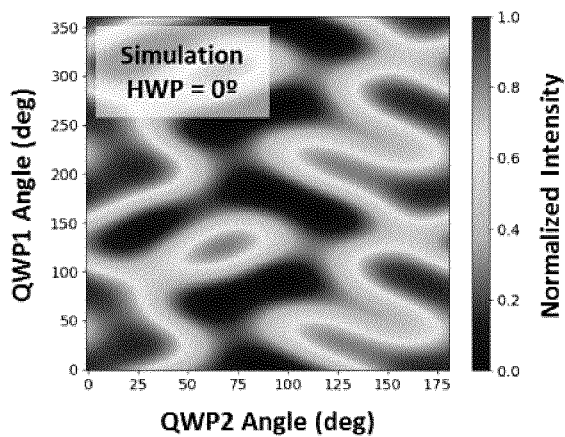
FIGS. 5*c-d* show simulated polarisation maps for the same half-wave plate angles produced after extracting the fibre parameters.
Figure 5D:
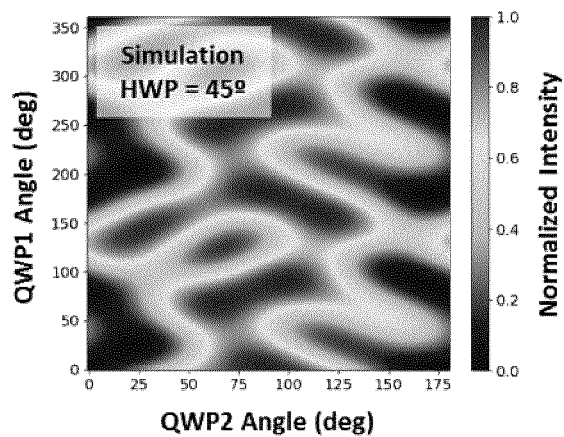

Looking at FIG. 4, there is shown flowchart 200 outlining a procedure for delivering polarized light via a fibre while compensating for transmission impairments due the fibre. In more detail, in step 202, the fibre's effects on polarisation are characterised by sending known states into the fibre and fitting the resulting output states to a model of the system. Using a set orientation angles of HWP 18, the intensity of light reaching PD2 28 is measured as a function of QWP1 20 and QWP2 34 angles. Examples of the resulting polarisation maps are shown in FIGS. 5a,b for two different angles of HWP 18. FIGS. 5c, d show simulated polarisation maps for the same HWP 18 angles produced after extracting the fibre parameters. Accurate compensation for the effects of fibre 24 depends on the quality of these initial polarisation maps, so higher resolutions and additional maps therefore result in better fibre characterisation. There is a trade-off, however, between accurate fibre characterisation and the time required to acquire these maps. In the system, the speed at which each data set is produced was limited by the speed of QWP2 34's piezoelectric rotator, which dissipated heat in refrigerator 30 as it rotated. At room temperature, 4000-data-point maps were produced in 3 hours. For identical resolution at low temperatures, each data set required approximately 7 hours to produce, and the mixing chamber temperature rose to approximately 140 mK during those runs. The reliability of the polarisation maps and fitted fibre parameters depends on the fibre birefringence remaining constant. Consequently, all polarisation measurements are made only when the refrigerator 30 has reached a stable temperature, and new polarisation maps must be acquired and fit if there is any significant change in the state of the fibre. Minor changes, such as those due to small vibrations, do not appear to significantly affect the results for fibres of the length used in the experiments.

In step 204, to obtain the fibre parameters, the polarisation maps are fit to the model using a custom-made genetic algorithm program. The algorithm simulates the optical system using Jones calculus and the fibre model discussed above. Starting with several randomly-selected seed values for the unknown parameters, the program employs mutations and recombinations over many generations to evolve each solution and find the values which cause the simulation to fit the data. Depending on the amount of data being fit, the program usually requires only 200-300 genetic iterations to solve for the fibre parameters with sufficient accuracy. The genetic algorithm program comprises at least ten input parameters which are set by the user i.e. the three fibre parameters, the retardances of the three waveplates, the offsets between the three waveplates' fast axes and the '0°' setting of their respective rotators, and the offset between linear polariser 16 and linear polariser 36. The three fibre values are typically the only variables which are fit, while the other parameters are measured directly and used as fixed parameters in the fitting procedure. For greatest accuracy of the results, multiple data sets are loaded into the algorithm program simultaneously. A preliminary test of the program's output is achieved by simulating the data using the fitted fibre parameters. FIG. 5 shows a comparison of low-temperature polarisation maps and the corresponding simulations after fitting. The fitted fibre values for those two data sets were: $\theta_a = 96.96°$, $\theta_b = 101.5°$, and $\phi = 106.9°$. The retardance of QWP2 34 was also fit in this case to verify that it was not significantly affected by the temperature. The fitting algorithm returned a retardance of 95.4°, which is close enough to the ideal value of 90° to use the waveplate for accurate identification of polarisation states in the refrigerator 30.

Figure 6A:
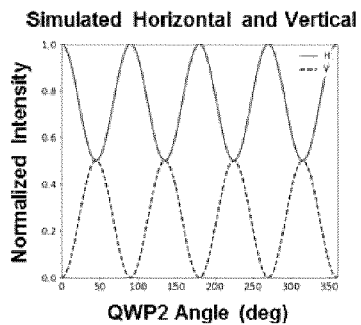
FIGS. 6*a-c* show simulations of the signatures for the six standard states.
Figure 6B:
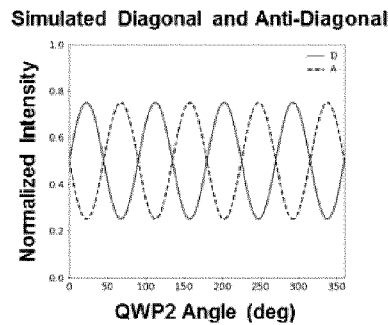
Figure 6C:
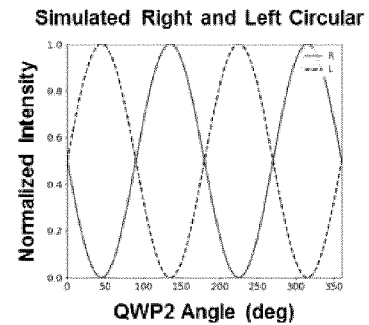

After obtaining the fibre parameters, in step 206 the model is used to calculate the waveplate orientations i.e. HWP 18 and QWP1 20 angles required to compensate for fibre 24 and obtain the desired state in refrigerator 30. Once the waveplates HWP 18 and QWP1 20 have been properly oriented, the polarized light is sent through fibre 24 to dilution refrigerator 30. Measuring the light intensity as a function of the QWP2 34 angle produces a signature which is unique to each polarisation, allowing for confirmation of the states exiting the lensed fibre, step 208. FIGS. 6a-c shows data and simulations of six such signatures. These six 'standard' polarisations (horizontal, vertical, diagonal, anti-diagonal, right circular and left circular) form the basis in which polarisation experiments are conducted. As each signature repeats after a 180°-rotation of QWP2 34, data was only taken over that range to reduce heat dissipation in refrigerator 30.

The measured and calculated signatures of the six standard polarisations are displayed in FIG. 6b. The simulations in these graphs (black lines) were produced using the fitted QWP2 34 retardance, whereas the simulations shown in FIGS. 6a-c use the ideal retardance. For each of these polarisations, the desired state was successfully delivered to refrigerator 30 at low temperatures using the unique set of waveplate angles calculated for it. Deviations of the data from the simulations in these plots are attributed to slight depolarisation and fluctuations in the step size of the QWP2 34 rotator.

Figure 6D:
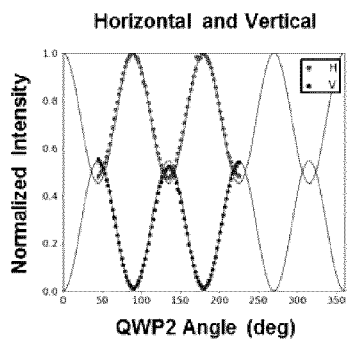
FIGS. 6*d-f* show low-temperature data overlaid on simulations of the six standard states.
Figure 6E:
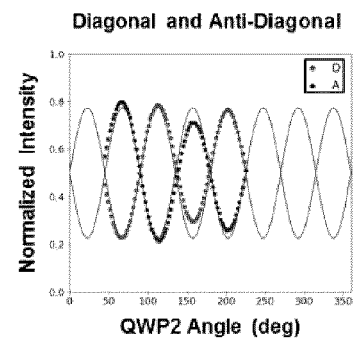
Figure 6F:
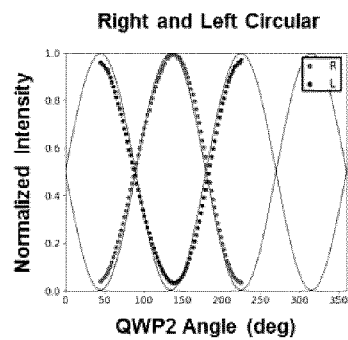
Figure 6G:
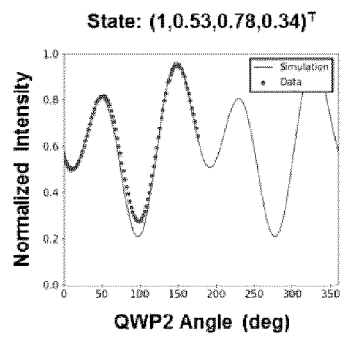
FIGS. 6*g-i* show low-temperature data for three randomly selected elliptical states overlaid on the corresponding simulations.
Figure 6H:
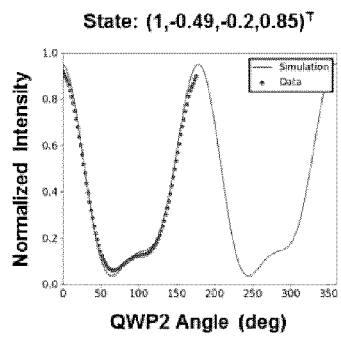
Figure 6I:
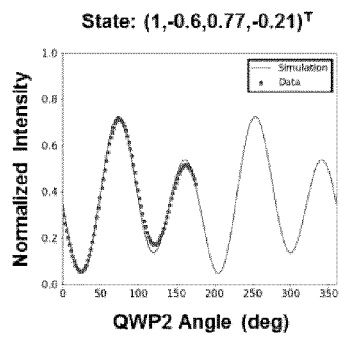

FIGS. 6a-c show simulations of the signatures for the six standard states; FIGS. 6d-f show low-temperature data overlaid on simulations of the six standard states; and FIGS. 6g-i show low-temperature data for three randomly-selected elliptical states overlaid on the corresponding simulations. To quantify the quality of the output states, their fidelities are calculated. For pure quantum states, the fidelity of a measured state $|\psi\rangle$ with respect to the expected state $|\phi\rangle$ is defined as:

$$F=|\langle\phi|\psi\rangle|^2 \tag{4}$$

Each individual photon is assumed to have the same polarisation as the overall beam of light. This quantum definition of fidelity is applied to the polarisation of a laser beam. To account for depolarisation and photon losses, a generalized definition of fidelity is applied. Using the standard equation for the density matrix ρ of a state on or within the Poincaré sphere, the fidelity of a given polarisation with respect to the state σ is defined as:

$$F = \left(Tr\sqrt{\sqrt{\sigma}\rho\sqrt{\sigma}}\right)^2 \tag{5}$$

While this equation for the fidelity of polarized light is excessively long when fully written out, one can easily derive the fidelity equations for the six standard polarisation states. These are summarized in Table I, where they are written in terms of the Stokes parameters ($S_1$, $S_2$, and $S_3$). At low temperatures, a fidelity of greater than 0.96 was achieved for all polarisations, with uncertainties of less than 0.007.

Table 1 shows equations for the fidelities of the six standard polarisation states, as well as the measured fidelities at both room temperature and low temperature.

TABLE 1

| State | Fidelity Equation | Room-Temp. Fidelity | Low-Temp. Fidelity |
|---|---|---|---|
| Horizontal | $\frac{1+S_1}{2}$ | 0.993 ± 0.001 | 0.994 ± 0.004 |
| Vertical | $\frac{1-S_1}{2}$ | 0.978 ± 0.004 | 0.978 ± 0.003 |
| Diagonal | $\frac{1+S_2}{2}$ | 0.986 ± 0.005 | 0.961 ± 0.007 |
| Anti-Diagonal | $\frac{1-S_2}{2}$ | 0.996 ± 0.005 | 0.964 ± 0.006 |
| Right | $\frac{1+S_3}{2}$ | 0.924 ± 0.003 | 0.983 ± 0.002 |
| Left | $\frac{1-S_3}{2}$ | 0.922 ± 0.003 | 0.968 ± 0.002 |

In addition to the six common polarisation states, three elliptical states were also chosen at random to verify that arbitrary polarisations would be delivered to refrigerator 30. These states were defined using Stokes vectors, $S^\mu=(S_0, S_1, S_2, S_3)^T$, where $S_0$ is the total (often so normalized) light intensity, and $S_1$, $S_2$, and $S_3$ are the proportion of the light which is polarised in the horizontal/vertical, diagonal/anti-diagonal, and right/left circular bases respectively. Written as Stokes vectors, the elliptical states selected were: $(1, 0.53, 0.78, 0.34)^T$, $(1, -0.49, -0.2, 0.85)^T$, and $(1, -0.6, 0.77, -0.21)^T$. After performing calculations of HWP 18 and QWP1 20 orientations required to produce these states, these states were generated in refrigerator 30, as shown in FIGS. 6g-i. Delivery of these randomly-selected elliptical states demonstrates that the system is able to deliver any arbitrary polarization to the refrigerator. The low-temperature verification tests were conducted at a temperature of 250 mK due heating caused by QWP2 34's piezoelectric rotator. Once the polarisation identification is complete, refrigerator 30 returns to base temperature as the rotator is no longer needed and the laser intensity can be reduced. Since the initial polarisation maps were produced at temperatures of approximately 140 mK, while the polarisation states were tested at 250 mK, only a small change in polarisation between 250 mK and base temperature is expected.

Figure 7A:
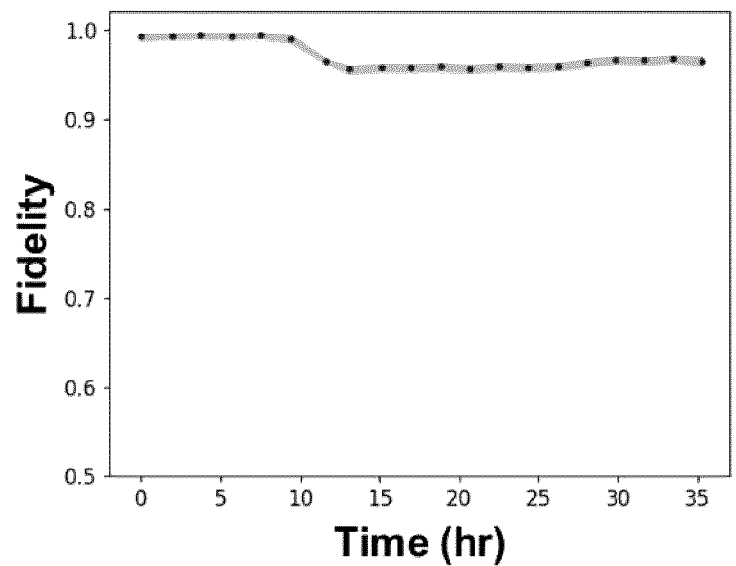
FIG. 7*a* shows the fidelity of the horizontal state monitored over a period of approximately 35 hours at low temperatures.
Figure 7B:
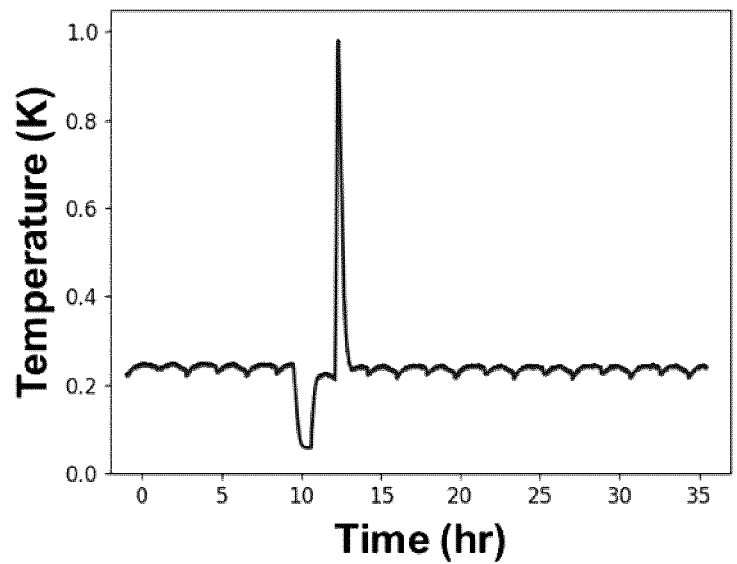
FIG. 7*b* shows the mixing chamber temperature during a monitoring period, including a brief temperature increase to 1K at hour 10.

As a measure of the system's stability, the fidelity of the horizontal state was monitored over a period of approximately 35 hours at low temperatures, as shown in FIG. 7a. The monitoring process involved continuous acquisition of the polarisation signature, followed by fitting of each plot to determine the state. Any change in the fibre's birefringence would be observable as a change in the fidelity of the polarisation. During the observation period, the fidelity of the horizontal state remained above 0.955 and was very stable. The uncertainty of the fidelity (light blue) arises from the standard deviation in the fit of the fibre output state. As shown in FIG. 7b, changes in the mixing chamber temperature which occurred during the monitoring period caused a shift in the polarisation from horizontal, i.e. $(1, 1, 0, 0)^T$, to the slightly elliptical state $(1, 0.97, 0.05, 0.2)^T$. This new state remained highly stable over the next 24 hours. It should also be noted that the waveplate angles used to produce the horizontal state were calculated using data obtained 2.5 days earlier. The system was therefore stable over a period of at least 4 days, with no indication of changes at the conclusion of the monitoring period. This degree of stability is likely due to the relatively short length of fibre in an experimental setup (30 m), and the controlled environment of a laboratory. Multi-kilometer-long fibres which are exposed to environmental influences such as vibrations and temperature fluctuations experience far greater polarisation instability and may therefore require more frequent fibre characterisation procedures [1, 5, 7]. The stability of the system, however, permits low-temperature experiments with polarised light over a period of at least several days without the need to re-characterise the fibre to be conducted.

In another exemplary implementation, after characterising the fibre using a laser beam, a single photon source is used for delivery of individual polarized photons at cryogenic temperatures.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

REFERENCES

[1] J. Chen, G. Wu, Y. Li, E. Wu, H. Zeng, *Opt. Express* 15, 26, 17928 (2007).

[2] G. B. Xavier, G. V. de Faria, G. P Temporiio, J. P. von der Weid, *Opt. Express* 16, 3, 1867 (2008).

[3] G. B. Xavier, N. Walenta, G. V. de Faria, G. P Temporiio, N. Gisin, H. Zbinden, J. P. von der Weid, *New J. Phys.* 11, 045015 (2009).

[4] A. N. Pinto, A. J. Almeida, N. A. Silva, N. J Muga, L. M. Martins, *Proc. SPIE* 8001, 80011M (2011).

[5] J. F. Dynes, I. Choi, A. W. Sharpe, A. R. Dixon, Z. L. Yuan, M. Fujiwara, M. Sasaki, A. J. Shields, *Opt. Express* 20, 15, 16339 (2012).

[6] OZ Optics (2016), *Electrically Driven polarisation Controller-Scrambler*. Retrieved on Feb. 10, 2019 at https://www.ozoptics.com/ALLNEW_PDF/DTS0011.pdf.

[7] Y.-Y. Ding, H. Chen, S. Wang, D.-Y. He, Z.-Q. Yin, W. Chen, Z. Zhou, G.-C. Guo, Z.-F. Han, *Opt. Express* 25, 22, 29923 (2017).

The invention claimed is:

1. A method of transmitting information via a transmission path, the method comprising the steps of:
generating a model of the transmission path comprising the steps of:
transmitting at least one photon of a known polarization state via a fibre; and
characterizing the fibre by determining at least one depolarization loss caused by the fibre by at least:
detecting the at least one photon outputted by the fibre;
determining the intensity of the outputted at least one photon;
measuring the output polarization state of the at least one photon to generate at least one polarization map;
determining characteristics of the transmission path by fitting the output polarization state of the at least one photon to the model using a genetic algorithm program; and
compensating for polarization altering effects of the fibre by at least:
determining an orientation angle of at least one optical component for introduction into the transmission path for compensating for polarization altering effects of the fibre.

2. The method of claim 1, wherein a single photon source is used for delivery of individual polarized photons at cryogenic temperatures.

3. The method of claim 2, wherein the cryogenic temperatures are provided by a closed cycle refrigeration system.

4. The method of claim 3, wherein the known polarization state comprises at least one of an elliptical state and a circular state.

5. The method of claim 4, wherein at least one waveplate compensates for the polarisation-altering effects of the fibre.

6. The method of claim 5, wherein the at least one waveplate comprises a half-wave plate.

7. The method of claim 5, wherein the at least one waveplate comprises a quarter-wave plate.

8. A method of transmitting information via a transmission path comprising the steps of:

(a) generating a model of the transmission path comprising the steps of:
(i) inputting at least one photon of a known polarization state from a light source into a one end of a fibre;
(ii) detecting the at least one photon outputted at another end of the fibre;
(iii) determining the intensity of the outputted at least one photon;
(iv) measuring the output polarization state of the at least one photon to generate at least one polarization map;
(b) determining characteristics of the transmission path by fitting the output polarization state of the at least one photon to the model;
(c) determining an orientation angle of at least one optical component for introduction into the transmission path for compensating for polarization altering effects of the fibre; and
wherein the at least one polarisation map is fit to the model using a genetic algorithm program.

9. The method of claim 8, wherein the program employs mutations and recombinations over a plurality of iterations to evolve each solution and determine values of input parameters to fit the at least one polarisation map.

10. The method of claim 9, wherein the input parameters comprise at least one of fibre parameters, retardances of waveplates, offsets between the waveplates' fast axes and settings of rotators associated with the waveplates, and an offset between at least two linear polarisers.

11. A method of compensating for transmission impairment, the method comprising:
receiving at least one photon of a known polarization state which has been distorted by an optical transmission channel;
processing the outputted at least one photon by modeling an optical fibre, corresponding to the optical fibre, in an optical transmission channel, corresponding to the optical transmission channel, the modeling using a plurality of input parameters comprising at least fibre parameters;
wherein at least one waveplate compensates for the polarisation-altering effects of the fibre, and wherein the plurality of input parameters comprises offsets between each of the at least one waveplates' fast axes and settings of at least one rotator associated with each of the at least one waveplate, and an offset between at least two linear polarisers.

12. The method of claim 11, wherein the plurality of input parameters comprises retardances of the at least one waveplate.

13. The method of claim 11, wherein an orientation of the at least one waveplate is determined by the fibre parameters.

14. The method of claim 11, wherein at least one photon is delivered with a fidelity greater than 0.96.

15. The method of claim 14, wherein at least one photon is delivered in any polarisation state, including elliptical and circular states, and wherein a phase of the at least one photon is preserved.

* * * * *